United States Patent

Czajkowski, Jr.

[11] 3,912,289
[45] Oct. 14, 1975

[54] VEHICLE LEVEL CONTROL

[76] Inventor: Edward H. Czajkowski, Jr., 37042 Camelot, Apt. 185, Sterling Heights, Mich. 48077

[22] Filed: Aug. 21, 1974

[21] Appl. No.: 499,375

[52] U.S. Cl.................................. 280/6.1; 200/188
[51] Int. Cl.².............................................. B60S 9/04
[58] Field of Search............ 280/6 H, 6 R, 6.1, 6.11, 280/124 F; 200/188

[56] References Cited
UNITED STATES PATENTS 1,871,177  8/1932  Held................................... 200/188
3,669,409  6/1972  Eranosian........................... 280/6.1

Primary Examiner—Philip Goodman
Attorney, Agent, or Firm—Peter A. Taucher; John E. McRae; Robert P. Gibson

[57] ABSTRACT

Disclosed is a control device responsive to various tilted conditions of a motionless vehicle to restore the vehicle to a level attitude. The control device selectively energizes jacks carried at the corners of the vehicle to raise the lowest corners, thereby causing the vehicle to assume a level condition. The control device is useful in such vehicles as mobile homes, flat bed trailers, and mobile missile launcher platforms.

1 Claim, 5 Drawing Figures

VEHICLE LEVEL CONTROL

The invention described herein may be manufactured, used, and licensed by or for the Government for governmental purposes without payment to me of any royalty thereon.

BACKGROUND AND SUMMARY OF THE INVENTION

Proposals have been made for locating missile launchers on flat bed trailers. As occassion might require, the trailer carrying the missile launcher would be moved on the highway and then overland to a selected off-road site. The trailer would then be anchored and supported, preferably in a substantially level attitude for proper positionment of the missile launcher.

The present invention proposes mechanism for effecting a levelling and anchoring operation on a mobile missile launcher platform or other vehicle; an aim of the mechanism is to effect the operation in a minimum time period, even when the vehicle is located on uneven or sloping terrain. The mechanism can include tilt-responsive switch structure operatively connected to vehihcle-raising jacks located at the four corners of the vehicle. The jacks at the lowest corners are energized by the switch structure to raise the associated corner areas until the vehicle assumes a level attitude.

RELATED PATENT APPLICATION

This application is related to an application filed concurrently herewith in the name of Erwin F'Geppert entitled "Vehicle Level Control," now Ser. No. 499,258.

THE DRAWINGS

Figure 3:
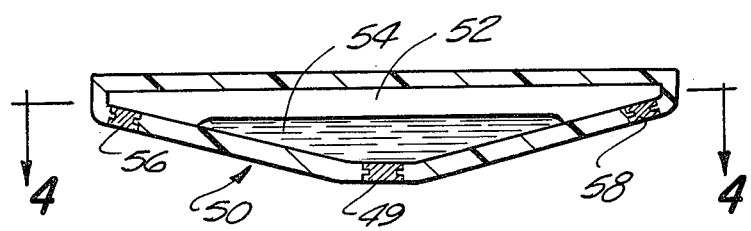
Figure 5:
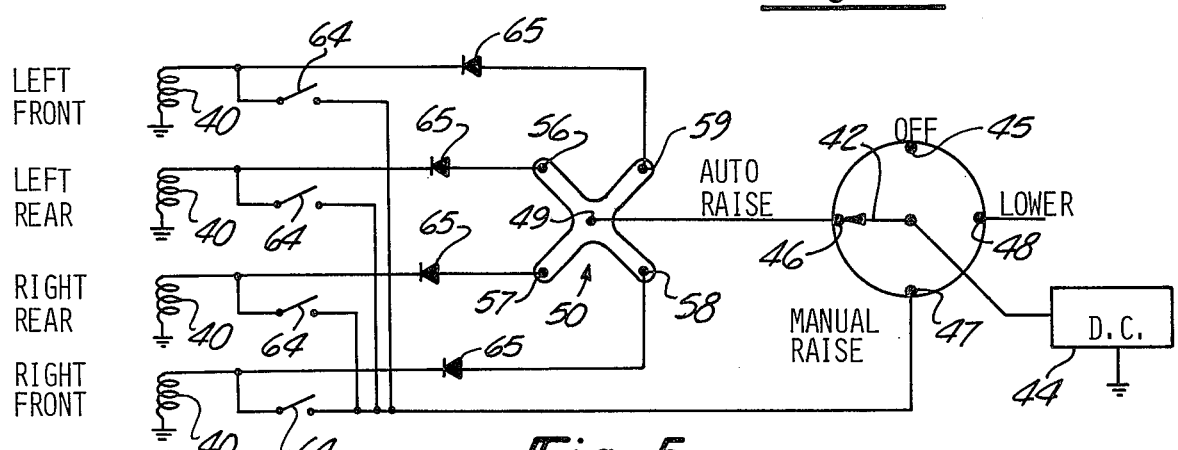

FIG. 5 schematically illustrates an electrical control circuit incorporating the FIG. 3 switch.

FIGURES 1 AND 2

Figure 1:
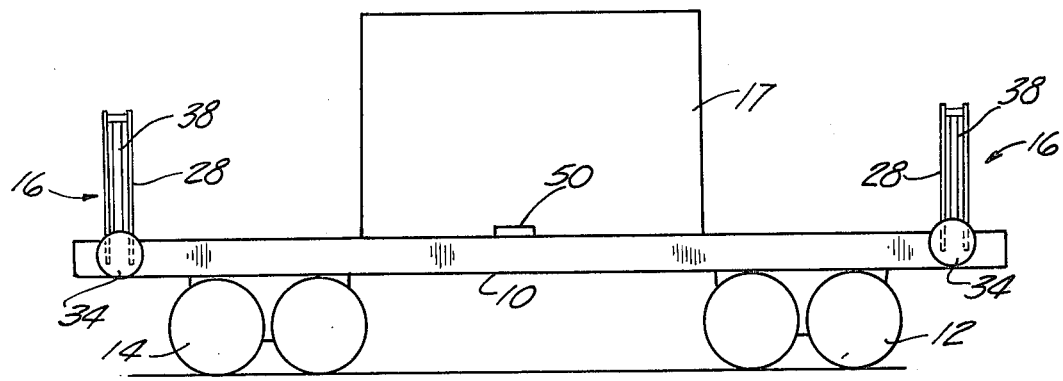
FIG. 1 is a side elevational view of a trailer suitable for use of the invention.

FIG. 1 shows a flat bed trailer 10 having front wheels 12 and rear wheels 14 for rollably supporting same during movement on and off the highway. A tractor, not shown, would be coupled to the trailer for towing purposes. At a selected site the tractor would be uncoupled from the trailer. Jacks 16 carried by the trailer at its four corners would then be energized to elevate and anchor the trailer in a stable level attitude. FIG. 1 schematically shows two jacks 16, one at the trailer front and one at the trailer rear. Two other jacks, not visible in FIG. 1, would be located in line with the illustrated jacks. Thus, four jacks are contemplated, one at each corner of the vehicle. The vehicle may be used to support a missile launcher, disignated by numeral 17, or other structure, not shown.

Figure 2:
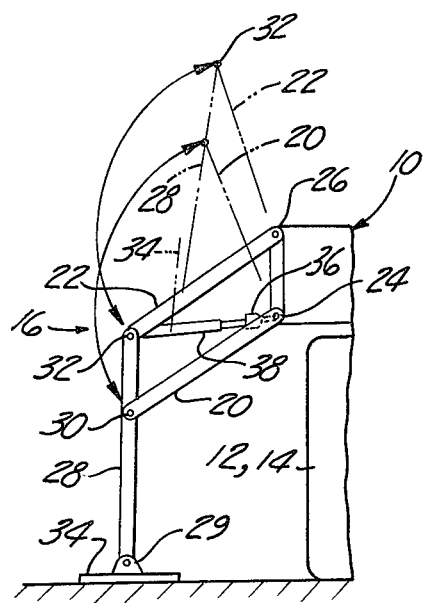
FIG. 2 is an elevational view of a jack structure used on the FIG. 1 trailer.
Figure 4:
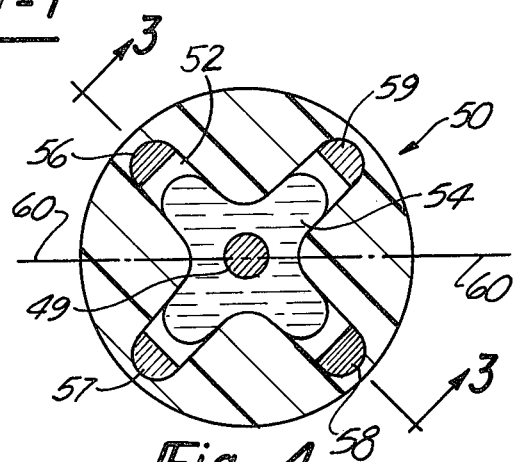
FIGS. 3 and 4 are sectional views taken through a tilt-responsive switch useful in practicing the invention.

FIG. 2 illustrates the general features of an illustrative jack structure. Any remotely-controllable jack structure that is susceptible to being attached to the vehicle is suitable. As shown in FIG. 2 the jack comprises two parallel links 20 and 22 pivotally attached to the vehicle at 24 and 26, and a leg structure 28 pivotally attached to the links, as at 30 and 32. The lower end of the leg structure is pivotally joined at 29 to a foot pad 34.

The jack structure may be powered between its FIG. 2 full line "use" position and the dashed line "storage" position by a variable length power means trained between pivots 32 and 24. The power means comprises an electric motor 36 and ball screw 38. The "nut" portion of the ball screw comprises an internally threaded sleeve 38 attached to pivot 32. The "screw" portion of the ball screw comprises a threaded shaft formed as an extension of the output shaft of motor 36; the threaded shaft extends into sleeve 38 so that energization of motor 36 produces translational motion of the sleeve on the threaded shaft. Motor 36 is connected to pivot 24 by suitable lug means, not visible in the drawing.

In the dashed line "storage" position of the jack structure pivots 24 and 32 are widely spaced. Motor 36 can be energized to draw pivot 32 toward pivot 24, thereby causing the links 20, 22 and leg structure 28 to uncork to the full line position. It is intended that the jack structures will carry the vehicle weight; i.e. the jack structures will sufficiently raise the trailer bed to transfer the sprung weight from the road wheels to the jack structures. The road wheels will continue to engage the ground surface, but the sprung weight will be borne by the jack structures; pads 34 will thus "anchor" the vehicle against inadvertant rolling movements.

During the latter stages of the vehicle raising operation each leg structure 28 will pivot inwardly about pivotal connection 29; i.e. leg 28 and links 20, 22 will tend to straighten out toward a straight-line relation, thereby raising pivot point 26 and hence the bed of the trailer. The trailer will move directly up without side sway or lateral displacement.

As previously noted, FIg. 2 is merely illustrative of one powered jack structure usable in practice of the invention. The jack power means can be electrical, hydraulic or pneumatic. In the case of electrical powering each of the four jack motors 36 can be energized in the "raise" mode through a conventional relay. In the case of hydraulic or pneumatic powering (fluid cylinders) each of the four power means can be controlled in the raise mode by means of a conventional solenoid valve located in the fluid power supply. In FIG. 5 the coils of the four raise-mode relays or valves are designated by numeral 40. The lower-mode coils are not shown in FIG. 5.

The FIG. 5 control means includes a manually-actuated selector switch 42 arranged to transmit D.C. electrical power from electric source 44 to a selected one of contacts 45, 46, 47 or 48. In the "auto-raise" position of manual switch 42 power is delivered to a contact 49 located on a tilt-responsive switch 50 carried by the vehicle. A tilted condition of the vehicle causes one or more contacts at the extremities of switch 50 to deliver power to the appropriate jack energizer 40.

The switch comprises a cruciform-shaped chamber 52 for an electrically conductive liquid 54 such as mercury. The switch is mounted on the vehicle so that when the vehicle assumes a level attitude liquid 54 is out of engagement with all four of the perimeter contacts 56, 57, 58 and 59 located in the chamber floor. The floor slopes down as shown.

Switch 50 is oriented on the vehicle so that contacts 58 and 59 are disposed toward the front of the vehicle, while contacts 56 and 57 are disposed toward the rear of the vehicle. Assuming that imaginary line 60 represents the front-to-rear direction taken by trailer 10 (normal to the road wheel axles), then contact 58 would be in a right-forward location, contact 59 would be in a left-forward location, contact 56 would be in a left-rearward location, and contact 57 would be in a right-rearward location. The coil 40 locations (FIG. 5) correspond to the jack locations.

In operation of the system, the four jacks can be moved from the storage positions (dashed lines in FIG. 2) to the "use" positions by setting manual switch 42 to the "manual-raise" position engaged with contact 47, and then closing manual switches 64. Diodes 65 can be used in the energization circuitry to prevent switch structure 50 from forming undesired energizer paths.

With vehicle weight transferred to the jack structures selector switch 42 can be moved to a position engaged with terminal 46, thereby effecting a vehicle levelling operation. Should the terrain be such that the vehicle front end tilts down relative to the rear end, contacts 59 and 58 will be below the level of liquid 54. The liquid will therefore immerse contacts 58 and 59 to form conductive paths to the front energizer coils. As the front jacks elevate the front end of the vehicle contacts 58 and 59 will be uncovered to deenergize the two front jacks.

The nature of jack energization is dependent on the initial attitude of the vehicle after conclusion of the manual raise operation. Usually the vehicle will tilt down at two adjacent corners, e.g. the right front corner and the right rear corner, or the two rear corners of any combination of two adjacent corners.

When it becomes necessary to move the vehicle to a new location switch 42 is moved to engage terminal 48. Coils similar to coils 40 connect with terminal 48 to energize motors 36 or their equivalent in the reverse direction, i.e. the direction that would allow the sprung vehicle weight to be transferred onto road wheels 12 and 14, and would thereafter move jacks 16 to the storage positions. In the "use" positions the jacks are required to bear the entire sprung vehicle weight. Therefore each motor 36 is preferably equipped with a brake mechanism for automatically preventing the motor output shaft from rotating when the motor is de-energized. Such a brake also holds the jack against inadvertant "uncorking" when it is in the storage position (dashed lines FIG. 2).

Preferably each motot 36 is controlled by a different contact (56, 57, 58 or 59) to provide levelling in two directions, i.e. front-to-rear and side-to-side. If it is deemed sufficient to provide automatic levelling in only one direction, e.g. front-to-rear, then a modified tilt-responsive switch structure having only two intermittently immersed contacts would be used; the contacts would be oriented in a front-rear relation. In that event the two front motors 36 would be energized by the front contact and the two rear motors 36 would be energized by the rear contact. Supplementary side-to-side levelling could be provided by manual switches 64 or a second tilt-responsive switch extending in a side-to-side direction.

I claim:

1. In a four cornered vehicle having right and left front wheels, and right and left rear wheels for overland transport of the vehicles: the improvement comprising means for anchoring and supporting the vehicle in a substantially level attitude on uneven or sloping terrain; said means comprising a jack means carried by the vehicle at each of its four corners, and electrical control means responsive to a tilted condition of the vehicle to selectively actuate the jack means for causing the vehicle to assume a substantially level attitude; said electrical control means comprising a miniature cruciform chamber which includes a central chamber area and four perimetrical chamber areas; said chamber being oriented on the vehicle so that a first perimetrical area, a second perimetrical area is disposed in a right-forward location relative to the central area, a third perimetrical area is disposed in a left-rearward location relative to the central area, and a fourth perimetrical area is disposed in a right-rearward location relative to the central area; first, second, third and fourth switch contacts disposed in respective ones of the perimetrical areas; a fifth switch contact disposed in the central chamber area; each of the perimetrical contacts being elevated relative to the fifth central contact when the vehicle assumes a level attitude; and an electrically-conductive liquid partially filling the chamber so that when the vehicle assumes a level attitude the central contact is immersed in the conductive liquid while none of the perimetrical contacts are so immersed; the amount of conductive liquid being sufficient that when the vehicle is tilted in any given direction the liquid gravitates in the chamber to bridge the chamber space between the central contact and the perimetrical contact that has been moved downward due to the vehicle-tilt action.

* * * * *